United States Patent [19]

Leibu

[11] 3,915,928

[45] Oct. 28, 1975

[54] INJECTION-MOLDABLE FILLED ELASTOMERIC COMPOSITION

[75] Inventor: Henry Joachim Leibu, Wilmington, Del.

[73] Assignee: E. I. Du Pont de Nemours and Company, Wilmington, Del.

[22] Filed: Nov. 29, 1974

[21] Appl. No.: 528,147

Related U.S. Application Data

[63] Continuation-in-part of Ser. No. 421,532, Dec. 4, 1973, abandoned.

[52] U.S. Cl. ........ 260/42.18; 260/42.33; 260/42.37; 260/80.7; 260/88.2 R
[51] Int. Cl.$^2$...................... C08K 7/14; C08K 3/04
[58] Field of Search........... 260/42.18, 42.33, 42.37, 260/80.7, 88.2 R

[56] References Cited
UNITED STATES PATENTS

| | | | |
|---|---|---|---|
| 3,673,150 | 6/1972 | Marzocchi | 260/42.18 |
| 3,746,669 | 7/1973 | Dunnom et al. | 260/42.18 |
| 3,819,591 | 6/1974 | Campbell et al. | 260/80.78 |

*Primary Examiner*—Donald E. Czaja
*Assistant Examiner*—H. H. Fletcher

[57] ABSTRACT

An elastomeric composition comprising a crystalline ethylene/propylene copolymer containing about 65–78% by weight ethylene units and, optionally, units of a monoreactive nonconjugated diene sufficient to provide up to 1 gram mole of carbon-carbon double bonds per kilogram of copolymer, said copolymer having an inherent viscosity of about 0.8–1.6, preferably about 1.0–1.4, about 40–150, preferably 50–100, parts by weight carbon black per 100 parts of the total copolymer composition, and about 5–30% by weight based on the weight of the total composition of glass fibers randomly dispersed throughout the composition. The composition when molded has a high modulus of elasticity and can be used in automotive trim application.

22 Claims, No Drawings

INJECTION-MOLDABLE FILLED ELASTOMERIC COMPOSITION

REFERENCE TO RELATED APPLICATION

This application is a continuation-in-part of application Ser. No. 421,532, filed Dec. 4, 1973, and now abandoned.

BACKGROUND OF THE INVENTION

This invention relates to a novel elastomeric composition and a process for making the same. More particularly, this invention is directed to an injection-moldable ethylene/propylene copolymer containing glass fibers and carbon black and a method for its production.

Recently, the use of elastomeric polymers for decorative and functional automotive parts has taken on important commercial significance. Elastomeric hydrocarbon copolymers are especially useful as automotive trim and in energy-absorbing systems, such as bumper assemblies for automobiles, because they can be molded into many configurations by compression molding and extrusion molding and then surface painted. Although the compositions can be molded to almost any configuration, fabrication of large parts made of elastomeric hydrocarbons by injection molding techniques is especially difficult and often impractical. Fabrication of articles by injection molding is preferred because, among other things, it is economical and efficient. However, when working with elastomers, very high pressures must be used in injection molding processes, as contrasted to plastics, because, generally, elastomers are much more viscous than plastics. For end uses requiring a composition having a high modulus of elasticity (flexural strength), such as in automotive trim application, the problem is especially difficult. To achieve a high modulus of elasticity with most elastomers usually requires that the elastomers be compounded with large amounts of reinforcing fillers. Unfortunately, the addition of large quantities of filler elevates the viscosity of the compounded elastomer so that injection molding requires impractically high injection pressures. On the other hand, compounding elastomers with reinforcing fillers which do not greatly elevate the viscosity of the compounded stock does not give finished parts possessing the required physical properties. Thus, such procedures for fabricating parts by injection molding have not been commercially feasible. Consequently, when large parts made from elastomers are fabricated, such as the grill assembly of an automobile, it becomes quite impractical to fabricate these large articles by injection molding due to, among other things, the high pressure required to force the elastomeric hydrocarbon through a small orifice and into the mold cavity. Therefore, there is a need for an elastomeric composition that can be readily fabricated by simple conventional injection molding techniques and, at the same time, possess the necessary physical properties of high modulus of elasticity, high tensile strength, hardness, compression set, and ability to recover rapidly to its original state when deformed. Such requirements are necessary when the compositions are used, for example, as a bumper assembly or fender extensions for automotive application. The present invention describes such a composition and method for its preparation.

SUMMARY OF THE INVENTION

A novel, injection-moldable, curable, elastomeric composition has been discovered which comprises (a) a crystalline ethylene/propylene copolymer containing about 65–78%, preferably about 68–74%, by weight ethylene units, said copolymer having an inherent viscosity of about 0.8–1.6, preferably about 1.0–1.4, (b) about 40–150 parts, frequently about 75–150 parts, and preferably about 50–100 parts, by weight carbon black per 100 parts of the total copolymer weight, and, (c) about 5–30% by weight based on the weight of the total composition of glass fibers randomly dispersed throughout the composition. The injection-moldable, curable, elastomeric copolymer preferably contains units of a monoreactive nonconjugated diene having only one polymerizable double bond present in the copolymer in an amount sufficient to provide about 0.2–1 gram mole of carbon-carbon double bonds per kilogram of copolymer. More preferably, the ethylene/propylene copolymer also contains units derived from a $C_5$–$C_{110}$, preferably a $C_5$–$C_{22}$, direactive diolefin having two polymerizable double bonds present in an amount resulting from the addition to the reaction mixture from which the copolymer is formed of about from 0.01–0.5 gram mole per kilogram of said crystalline copolymer.

The process for making an injection-moldable elastomeric composition comprises mixing a crystalline ethylene/propylene copolymer containing about 65–78%, preferably 68–74%, by weight ethylene units and, optionally, units of a monoreactive nonconjugated diene sufficient to provide up to 1 gram mole of carbon-carbon double bonds, usually at least 0.2 gram mole, per kilogram of copolymerr, and, most preferably, units of a $C_5$–$C_{110}$ direactive diolefin having two polymerizable double bonds present in an amount resulting from the addition to the reaction mixture from which the copolymer is formed of from about 0.01–0.5 gram mole per kilogram of crystalline copolymer, said copolymer having an inherent viscosity of about 0.8–1.6, preferably about 1.0–1.4, with about 40–150 parts, frequently about 75–150 parts, and preferably about 50–100 parts, by weight carbon black per 100 parts of the total copolymer weight, and about 5–30% by weight based on the weight of the total composition of glass fibers. The ingredients are mixed by conventional procedures using, for example, an internal mixer such as a Banbury mixer. Usually the elastomeric hydrocarbon and glass fibers are mixed thoroughly and the carbon black added with continued mixing until they are dispersed throughout the elastomeric composition.

DETAILED DESCRIPTION OF THE INVENTION

The copolymers that are used as a component of the elastomeric composition are crystalline ethylene/propylene copolymers containing about 65–78%, preferably 68–74%, by weight ethylene units; the balance can be propylene, and the copolymer has an inherent viscosity between about 0.8–1.6, preferably about 1.0–1.4. By inherent viscosity is meant the viscosity of a solution of 1/10 gram of copolymer in 100 milliliters of tetrachloroethylene at 30°C. Preferably, the copolymer contains units derived from a third monomer that is a monoreactive nonconjugated diene containing only one polymerizable double bond that is added to the copolymer in an amount sufficient to provide up to 1, usually at least 0.2, gram mole of carbon-carbon double bonds per kilogram of copolymer, thus providing sulfur cure-sites on the copolymer for vulcanization. Monoreactive nonconjugated dienes include aliphatic diolefins such as 1,4-hexadiene, 1,9-octadecadiene, 6-methyl-1,5-heptadiene, and 1,6-octadiene; cycloaliphatic diolefins include dicyclopentadiene, tricyclopentadiene, 5-ethylidene-2-norbornene, 5-methylene-2-norbornene, alkenyl-substituted norbornenes having an internal double bond in the alkenyl group, for example, 5-(2'-butenyl)-2-norbornene, and especially those cycloaliphatic compounds having a one- or two-carbon bridged ring structure. Most preferably, the copolymer also contains units derived from a $C_5-C_{110}$, preferably $C_5-C_{22}$, direactive diolefin containing two polymerizable double bonds, said direactive diolefin units being present in an amount resulting from the addition to the reaction mixture from which the copolymer is formed of about from 0.1 to 0.5 gram mole per kilogram of copolymer formed of said direactive diolefin. Copolymers containing a direactive nonconjugated diene are preferred because they are easy to handle in the process of their preparation and in their subsequent compounding. Representative direactive diolefins containing two polymerizable double bonds that effectively branch the copolymer include 1,4-pentadiene, 1,5-hexadiene, 1,7-octadiene, 1,9-decadiene, 1,20-heneicosadiene, 5-(5-hexenyl)-2-norbornene, 5-(2-propenyl)2-norbornene, norbornadiene-2,5, and the reaction product of norbornadiene-2,5 and cyclopentadiene, namely, 1,4,4a,5,8,8a-hexahydro-1,4,5,8-dimethanonaphthylene, and the dimer thereof. Copolymers containing both a mono-reactive nonconjugated diene and a direactive diolefin that can be used in the present invention are disclosed in U.S. application Ser. No. 247,879, filed Apr. 13, 1972, now U.S. Pat. No. 3,819,591, which is incorporated herein by reference.

The term "polymerizable double bond" means terminal unhindered double bond in the monomer and the double bond in strained ring cycloaliphatic structures such as in the norbornene ring.

The amount of propylene units present in the copolymer is generally between about 14 to 35 percent by weight. Other alpha-olefins can be present with the propylene up to about 10% the amount of propylene present.

Glass fibers are present in the elastomeric composition in amounts from about 5–30% by weight, preferably about 10–20%, based on the weight of the total composition. These glass fibers are randomly dispersed throughout the composition and contribute much to the strength of the product. Generally, glass fibers have diameters of about 0.0003 to 0.0008 inch, with an average length between about 0.010 and 0.100 inch when incorporated in the composition. For ease of handling, the glass fibers are usually added in small bundles such as chopped yarns, strands or cords, although they can be added as individual fibers such as in glass flock. Such bundles conveniently have lengths of about ¼ to ½ inch. However, during mixing when the glass fibers are dispersed throughout the composition, they break apart, become separated, and are reduced in length to about 0.010–0.100 inch.

The elastomeric composition also contains about from 40–150 parts, frequently from 75–150 parts, and preferably from about 50–100 parts, by weight carbon black per 100 parts of the total copolymer weight. The carbon black can be a furnace black or a channel black that are termed reinforcing carbon black or semi-reinforcing carbon black. Generally, the particle size of the carbon black is between 180–800A, usually 180–300 A, which is readily dispersible in the elastomer.

It has been observed that under certain climatic conditions when the article is painted and used as, for example, a bumper for automobiles, a slight peeling or blistering of the paint may sometimes occur in the area where the metal fastening means, e.g., zinc plated steel bolts, contacts the unpainted portion of the bumper. This might be due to galvanic action between the rubber and metal, possibly aided by water and salts in the environment. In order to lessen a tendency or eliminate the occurrence of this phenomenon, one should use smaller quantities of carbon black within the range disclosed herein or select a carbon black having less conductivity, or a combination of both. To avoid this problem the carbon black level in the copolymer should not be greater than 100 parts by weight per 100 parts of the total copolymer weight; preferably, the amount of carbon black is from about 50–100 parts by weight per 100 parts of the total copolymer weight.

Preferably, the crystalline copolymer is the only elastomeric component used in the composition of this invention and, as indicated above, in such case the amount of carbon black used is based upon the weight of the crystalline copolymer, e.g., 40–150 parts by weight per 100 parts of the crystalline copolymer. However, the copolymer compositions of this invention can also contain amorphous ethylene, propylene copolymers, such as an ethylene, propylene copolymer, tripolymer containing 1,4-hexadiene, or tetrapolymer containing norbornadiene. These amorphous copolymers contain about 45–60% by weight ethylene units. Generally, not more than about 50% by weight of said amorphous copolymer based on the total copolymer weight is incorporated into the composition.

Known extending oils for rubber can be incorporated into the elastomeric composition. The extending oils which can be used cover a wide range of oils having various chemical and physical properties. Any of the well-known oils that are compatible with rubber, ranging from very light to very viscous, can be used as extending oils in accordance with well-known practices. Extender oils include those that are naphthenic, aromatic and highly aromatic. The amount of extender oil employed will generally be from about 10 to 60 parts by weight for each 100 parts by weight of copolymer.

The elastomeric composition of this invention can be vulcanized to enhance its properties in accordance with known methods. Various free radical-producing agents can be used for this purpose, organic peroxides being especially suitable. Representative peroxides include 2,5-bis(t-butylperoxy)-2,5-dimethylhexane, bis($\alpha,\alpha$-dimethyl-p-methylbenzyl)peroxide, benzyl($\alpha,\alpha$-dimethylbenzyl)-peroxide, and others. Preferably, however, sulfur-cure systems of the conventional type known are used. Generally, all that is required is that the composition be heated under pressure to about from 330° to 380°F. for about 1 to 30 minutes. Frequently during injection molding heat, sufficient to cause vulcanization of the composition, is generated when the material passes through the small orifice in the nozzle of the apparatus as it is moved to the mold cavity.

For a further understanding of the invention, the following examples are illustrative and are not to be considered as limiting the underlying principles of the invention.

EXAMPLE 1

A copolymer composed of ethylene, propylene, 1,4-hexadiene and 2,5-norbornadiene units which contains 70% by weight of ethylene, sufficient 1,4-hexadiene to yield a 0.54 gram-mole of carbon-carbon double bonds per kilogram of copolymer, and an amount of 2,5-norbornadiene resulting from the addition to the reaction mixture from which the copolymer is formed of about 0.049 gram-mole per kilogram of copolymer, with the remainder of the composition being propylene, and having an inherent viscosity of 1.15 is mixed in an internal mixer with the following materials, all proportions being in parts by weight:

| | |
|---|---|
| Polymer | 100 |
| FEF Carbon Black | 120 |
| Paraffinic rubber processing oil ("Sunpar" 115, Sun Oil Co.) | 45 |
| Zinc Oxide | 5 |
| Zinc Stearate | 1 |
| Chopped glass fiber (Owens Corning Fiberglas K-885-AB) | 40 |
| Zinc Dibutyldithiophosphate | 3.0 |
| Mercaptobenzothiazole | 1.0 |
| Sulfur | 2.0 |

The compound is mixed in two passes in the internal mixer, the zinc dibutyldithiophosphate, mercaptobenzothiazole and sulfur being withheld until the second pass.

From the compound so mixed, parts requiring approximately a 38 oz. shot are injection molded using a reciprocating screw injection molding machine with nominal 60 oz. capacity and a 450 ton clamp capacity. Conditions during molding are as follows:

| | |
|---|---|
| Cylinder Temperature | |
| Rear | 160°F. |
| Center | 190°F. |
| Front | 220°F. |
| Nozzle Temperature | 250–270°F. |
| Mold Temperature | 370°F. |

Injected parts are retained in the mold for 90 seconds following the termination of injection to effect vulcanization of the part. At approximately 17,000 psi injection pressure, filling the mold requires 10.0 seconds.

Unvulcanized compound has a viscosity as follows:

Mooney Viscosity, Small Rotor

Minimum Reading at 250°F.     21

Test slabs compression molded from the compound and cured for 10 minutes at 350°F. have the following physical properties:

| | |
|---|---|
| Stress/Strain Properties | |
| 100% Modulus, psi | 1170 |
| Tensile Strength, psi | 1420 |
| Ultimate Elongation, % | 135 |
| Hardness, Shore D | 40 |
| Tangent Modulus of Elasticity (ASTM Method D-790-66 Method 1, Procedure B) | |
| Machine Direction, psi | 29,800 |
| Counter Machine Direction, psi | 9,700 |

EXAMPLE 2

The procedure described in Example 1 is repeated except that 60 parts of chopped glass fibers are used. Filling the mold during injection molding requires 7 seconds at 17,000 psi. Physical properties of the compound are as follows:

| | |
|---|---|
| Mooney Viscosity, Small Rotor (uncured) | |
| Minimum Reading at 250°F. | 16.2 |
| Stress/Strain Properties (Compression molded, press cured, 10 minutes at 350°F.) | |
| 100% Modulus, psi | 1150 |
| Tensile Strength, psi | 1350 |
| $E_B$, % | 124 |
| Hardness, Shore D | 42 |
| Tangent Modulus of Elasticity (Compression molded, press cured, 10 minutes at 350°F., ASTM Method D-790-66 Method 1, Procedure B) | |
| Machine Direction, psi | 36,000 |
| Counter Machine Direction, psi | 12,500 |

EXAMPLE 3

The procedure described in Example 1 is repeated except the copolymer is composed of ethylene, propylene, and 1,4-hexadiene units containing 76% of ethylene by weight and sufficient 1,4-hexadiene to yield 0.51 g-mole of carbon-carbon double bonds per kilogram of copolymer with the remainder of the composition being propylene; and having an inherent viscosity of 1.3. Performance on injection molding and physical properties of the vulcanized composition are substantially similar to those of Example 1.

EXAMPLE 4

The procedure described in Example 1 is repeated except the copolymer is composed of ethylene and propylene units and contains 70% by weight ethylene and 30% by weight propylene; and having an inherent viscosity of 1.2. Performance on injection molding and physical properties of the vulcanized composition are substantially similar to those of Example 1.

EXAMPLE 5

The procedure described in Example 1 is repeated except that the copolymer is mixed with the following proportions being in parts by weight:

| | |
|---|---|
| Copolymer | 100 |
| SRF Carbon Black (Sterling N765, Cabot Corp.) | 60 |
| Petroleum Oil (Tufflo 6204, Arco Chemical Co.) | 10 |
| Zinc Oxide | 5 |
| Zinc Stearate | 1 |
| Chopped glass fibers (Owens Corning Fiberglass K-885-AB) | 40 |
| Zinc Dibutyldithiophosphate | 2 |
| Mercaptobenzothiazole | 1 |
| Sulfur | 1.5 |

The materials are mixed in a single pass in an internal mixer except for the zinc dibutyldithiophosphate, mercaptobenzothiazole, and sulfur which are withheld and subsequently mixed into the compound on a rubber mill. Physical properties of the composition are shown in Table I.

EXAMPLE 6

The procedure of Example 5 is repeated except that the polymer is a 50/50 mixture of the copolymer of Example 5 and a copolymer composed of ethylene, propylene, 1,4-hexadiene and 2,5-norbornadiene units which contains about 54% by weight of ethylene, sufficient 1,4-hexadiene to yield .54 gram-mole of carbon-carbon double bonds per kilogram of copolymer, and an amount of 2,5-norbornadiene resulting from the addition to the reaction mixture from which the copolymer is formed of 0.044 gram mole per kilogram of copolymer, with the remainder of the composition being propylene; and which has an inherent viscosity of 1.15. As can be seen from Table I, this example demonstrates that even though the composition contains 50% by weight of a less crystalline copolymer, based on the total copolymer weight, the advantages of the invention are still observed in the modulus of elasticity and tear strength.

COMPARATIVE EXAMPLE

The procedure of Example 5 is repeated except the polymer is a copolymer composed of ethylene, propylene, 1,4-hexadiene and 2,5-norbornadiene units which contains about 54% by weight of ethylene, sufficient 1,4-hexadiene to yield 0.54 gram-mole of carbon-carbon double bonds per kilogram of copolymer, and an amount of 2,5-norbornadiene resulting from the addition to the reaction mixture from which the copolymer is formed of 0.044 gram-mole per kilogram of copolymer, with the remainder of the composition being propylene; and which has an inherent viscosity of 1.15. Physical properties of the composition are shown in Table I. Comparison of this Example with Example 5 illustrates the surprising superiority of the compositions of this invention with respect to stiffness as measured by modulus of elasticity and tear strength.

TABLE I

PHYSICAL PROPERTIES

| | Examples | | Comparative |
|---|---|---|---|
| | 5 | 6 | Example |
| Mooney Viscosity, Small Rotor Minimum Reading at 250°F. | 19 | 21 | 22 |
| Stress/Strain Properties (Compression Molded, Press Cured, 10 Minutes at 350°F.) | | | |
| 100% modulus, psi | 830 | 700 | 610 |
| Tensile strength, psi | 1940 | 1760 | 1820 |
| Ultimate Elongation, % | 340 | 310 | 300 |
| Hardness, Shore A | 82 | 82 | 74 |
| Tear Strength, Die C (ASTM D-624-54), pounds/linear inch | 245 | 185 | 155 |
| Tangent Modulus of Elasticity (ASTM D-790-71, Method I, Procedure B) | | | |
| Machine Direction, psi | 28,000 | 14,500 | 7,700 |
| Counter Machine Direction, psi | 8,000 | 4,100 | 2,300 |

I claim:

1. An injection-moldable, curable elastomeric composition comprising (a) a crystalline ethylene/propylene copolymer containing about 65–78% by weight ethylene units, said copolymer having an inherent viscosity of about 1- 1.4, (b) about 75–150 parts by weight carbon black per 100 parts of the total copolymer weight, and (c) about 5–30% by weight based on the weight of the total composition of glass fibers randomly dispersed throughout the composition.

2. A composition of claim 1 wherein the copolymer contains units of a monoreactive nonconjugated diene having only one polymerizable double bond present in an amount sufficient to provide about 0.2–1 gram-mole of carboncarbon double bonds per kilogram of copolymer.

3. A composition of claim 2 wherein units of the monoreactive nonconjugated diene are derived from 1,4-hexadiene or ethylidene norbornene.

4. A composition of claim 2 wherein the copolymer contains units derived from $C_5$–$C_{110}$ direactive diolefin having two polymerizable double bonds present in an amount resulting from the addition to the reaction mixture from which the copolymer is formed of about from 0.01–0.5 gram-mole per kilogram of said crystalline copolymer.

5. A composition of claim 4 containing about 10–20% by weight based on the weight of the total composition of glass fibers.

6. A composition of claim 4 wherein the copolymer contains units derived from $C_5$–$C_{22}$ direactive diolefin having two polymerizable double bonds.

7. A composition of claim 6 wherein units of the monoreactive nonconjugated diene in the copolymer are derived from 1,4-hexadiene.

8. A composition of claim 6 wherein units of the monoreactive nonconjugated diene in the copolymer are derived from ethylidene norbornene.

9. A composition of claim 6 wherein units of the direactive diolefin in the copolymer are derived from norbornadiene.

10. A composition of claim 7 wherein units of the direactive diolefin in the copolymer are derived from norbornadiene.

11. A composition of claim 10 wherein the glass fibers have an average length of from about 0.010–0.100 inch.

12. A composition of claim 1 wherein the crystalline ethylene/propylene copolymer contains about 68–74% by weight ethylene units.

13. A process for making an injection-moldable elastomeric composition comprising mixing a crystalline copolymer of ethylene and propylene containing about 65–78% by weight ethylene units, said copolymer having an inherent viscosity of about 1–1.4 with about 75–150 parts by weight carbon black per 100 parts of the total copolymer weight and about 5–30% by weight based on the weight of the total composition of glass fibers.

14. A process of claim 13 wherein the crystalline copolymer contains units of a monoreactive nonconjugated diene having only one polymerizable double bond present in an amount sufficient to provide about 0.2–1 gram mole of carbon-carbon double bonds per kilogram of copolymer.

15. A process of claim 14 wherein the monoreactive nonconjugated diene is 1,4-hexadiene or ethylidene norbornene.

16. A process of claim 14 wherein the copolymer contains units derived from a $C_5$–$C_{110}$ direactive diolefin having two polymerizable double bonds present in an amount resulting from the addition to the reaction mixture from which the copolymer is formed of about from 0.01–0.5 gram-mole per kilogram of said crystalline copolymer.

17. A process of claim 16 wherein the copolymer contains units derived from a $C_5$–$C_{22}$ direactive diolefin.

18. A process of claim 17 wherein glass fibers are added to the mix in an amount of about 10–20% by weight based on the weight of the total composition.

19. A process of claim 17 wherein units of the monoreactive nonconjugated diene are derived from 1,4-hexadiene.

20. A process of claim 17 wherein units of the monoreactive nonconjugated diene are derived from ethylidene norbornene.

21. A process of claim 17 wherein units of the direactive diolefin are derived from norbornadiene.

22. A process of claim 19 wherein units of the direactive diolefin are derived from norbornadiene.

\* \* \* \* \*